(12) United States Patent
Ata et al.

(10) Patent No.: US 10,458,789 B2
(45) Date of Patent: Oct. 29, 2019

(54) SIGNAL PROCESSING DEVICE, SENSOR DEVICE, AND SIGNAL PROCESSING METHOD

(71) Applicant: Mitsubishi Electric Corporation, Tokyo (JP)

(72) Inventors: Daiki Ata, Tokyo (JP); Keiichi Yamada, Tokyo (JP); Kazuhiko Nakamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/344,812

(22) PCT Filed: Sep. 15, 2017

(86) PCT No.: PCT/JP2017/033578
§ 371 (c)(1),
(2) Date: Apr. 25, 2019

(87) PCT Pub. No.: WO2019/053896
PCT Pub. Date: Mar. 21, 2019

(65) Prior Publication Data
US 2019/0265031 A1     Aug. 29, 2019

(51) Int. Cl.
*G01C 3/08*     (2006.01)
*G01B 11/10*     (2006.01)
(Continued)

(52) U.S. Cl.
CPC .............. *G01C 3/08* (2013.01); *G01B 11/026* (2013.01); *G01B 11/105* (2013.01); *G10L 21/0208* (2013.01); *G01S 17/00* (2013.01)

(58) Field of Classification Search
CPC ......... G01S 17/00; G01C 3/08; G01B 11/105; G01B 11/026; G01L 21/0208
(Continued)

(56) References Cited

U.S. PATENT DOCUMENTS 7,362,419 B2 *   4/2008   Kurihara ................. G01S 7/493
                                                                                 257/E27.131
9,449,371 B1 *   9/2016   Sheng ..................... G06T 5/002
(Continued)

FOREIGN PATENT DOCUMENTS

JP       4-176208 A     6/1992
JP       5-252000 A     9/1993
(Continued)

OTHER PUBLICATIONS

International Search Report and Written Opinion dated Dec. 5, 2017 for PCT/JP2017/033578 filed on Sep. 15, 2017, 7 pages with translation of the International Search Report.
(Continued)

*Primary Examiner* — Mark Hellner
(74) *Attorney, Agent, or Firm* — Xsensus LLP

(57) ABSTRACT

A signal processing device for performing processing for reducing noise in a displacement amount measured on a basis of light reflected from a detection object includes a moving-average calculating unit that performs moving average calculation for an input signal to reduce a noise component included in the input signal and an infinite impulse response filter that reduces a noise component included in an input signal by digital signal processing. A filter coefficient of the infinite impulse response filter is determined on a basis of a difference between a first calculation result output by the moving-average calculating unit and a second calculation result output by the infinite impulse response filter when a same signal is input to the moving-average calculating unit and the infinite impulse response filter.

17 Claims, 6 Drawing Sheets

(51) Int. Cl.
*G10L 21/0208* (2013.01)
*G01B 11/02* (2006.01)
*G01S 17/00* (2006.01)

(58) Field of Classification Search
USPC ........................................................ 356/4.07
See application file for complete search history.

(56) References Cited

U.S. PATENT DOCUMENTS

| | | |
|---|---|---|
| 2001/0008543 A1 | 7/2001 | Tanada |
| 2011/0069299 A1* | 3/2011 | Hsu .................. G01C 3/085 |
| | | 356/4.02 |
| 2012/0314946 A1 | 12/2012 | Nomura et al. |
| 2016/0252370 A1 | 9/2016 | Yuguchi |

FOREIGN PATENT DOCUMENTS

| | | |
|---|---|---|
| JP | 2001-24727 A | 1/2001 |
| JP | 2002-280997 A | 9/2002 |
| JP | 2006-197726 A | 7/2006 |
| JP | 2012-256202 A | 12/2012 |
| JP | 2014-052282 A | 3/2014 |
| JP | 2016-156789 A | 9/2016 |

OTHER PUBLICATIONS

Decision to Grant a Patent received for Japanese Patent Application No. 2018-531264, dated Jul. 17, 2018, 3 pages including translation.

* cited by examiner

FIG.8

| | 41A | 41B | 42A | 42B | 43A | 43B | FEATURE |
|---|---|---|---|---|---|---|---|
| #1 | ON | OFF | ON | OFF | ON | OFF | EQUIVALENT CONFIGURATION TO FIRST EMBODIMENT |
| #2 | OFF | ON | OFF | ON | OFF | ON | EQUIVALENT CONFIGURATION TO SECOND EMBODIMENT |
| #3 | ON | OFF | OFF | OFF | OFF | ON | ONLY MOVING AVERAGE CAN BE PERFORMED |
| #4 | OFF | ON | OFF | OFF | ON | OFF | ONLY RECURSIVE FILTERING BY IIR CAN BE PERFORMED |

SIGNAL PROCESSING DEVICE, SENSOR DEVICE, AND SIGNAL PROCESSING METHOD

CROSS-REFERENCE TO RELATED APPLICATIONS

The present application is based on PCT filing PCT/JP2017/033578 filed Sep. 15, 2017, the entire contents of which are incorporated herein by reference.

FIELD

The present invention relates to a signal processing device that performs signal processing in a laser displacement sensor device that emits laser light to a measurement target and obtains a displacement amount of the target on the basis of reflected light of the laser light.

BACKGROUND

A laser displacement sensor device repeatedly measures the intensity of laser light reflected from a measurement target and calculates displacement amounts of the target on the basis of the results of the measurements. The result of the measurement of the light intensity contains noise, and therefore the calculated displacement amount also contains noise. The noise contained in the displacement amount is found in the form of a variation in the displacement amount when the displacement amount of the same target is repeatedly measured. For this reason, the laser displacement sensor device calculates moving average of the calculated results of the displacement amounts to thereby obtain a displacement amount having the noise reduced. For the calculation of moving average, an arithmetic mean is continuously calculated for a time-series digital signal over a specific period of time, as described in Patent Literature 1, for example. For example, the laser displacement sensor device obtains a moving average by adding up 64 pieces of data and dividing the resultant sum by 64, and determines that the obtained moving average is a displacement amount of the measurement target.

CITATION LIST

Patent Literature

Patent Literature 1: Japanese Patent Application Laid-open No. 2002-280997

SUMMARY

Technical Problem

Where noise is reduced using moving average, noise-reduction performance depends on the length of a section in respect of which moving average is calculated. That is, noise-reduction performance depends on the number of data for which moving average is calculated. Specifically, increasing the number of data for which the moving average is calculated improves the noise-reduction performance. Unfortunately, increasing the number of data for which the moving average is calculated lengthens the calculation time. For example, consider two cases in which: displacement amounts are obtained from a light intensity and these obtained displacement amounts are defined as final displacement amounts without calculation of moving average; and N displacement amounts are obtained from a light intensity and the moving average is calculated for the N displacement amounts to thereby obtain final displacement amounts. Comparison of these two cases reveals that a variation in the displacement amount obtained by the calculation of the moving average is approximately $1/\sqrt{N}$ of that obtained in the former case in which the moving average is not calculated, but the response time in the latter case is N times that in the former case.

The present invention has been achieved in view of the above problems, and an object of the present invention is to provide a signal processing device that enables a laser displacement sensor device to improve measurement performance and prevent increase in a response time, as well.

Solution to Problem

In order to solve the above problems and achieve the object, the present invention is a signal processing device to preform processing for reducing noise in a displacement amount measured on a basis of light reflected from a detection object. The device comprises: a moving-average calculating unit to perform moving average calculation for an input signal to reduce a noise component contained in the input signal; and an infinite impulse response filter to reduce a noise component contained in an input signal by digital signal processing. A filter coefficient of the infinite impulse response filter is determined on a basis of a difference between a first calculation result output by the moving-average calculating unit and a second calculation result output by the infinite impulse response filter, when a same signal is input to the moving-average calculating unit and the infinite impulse response filter.

Advantageous Effects of Invention

The signal processing device according to the present invention has an effect that a laser displacement sensor device can improve the measurement performance and prevent the increase in the response time, as well.

BRIEF DESCRIPTION OF DRAWINGS

FIG. 8 is a diagram illustrating setting patterns of respective switches included in a signal processing unit according to the third embodiment.

DESCRIPTION OF EMBODIMENTS

A signal processing device, a sensor device, and a signal processing method according to embodiments of the present invention will be described in detail below with reference to the accompanying drawings. The present invention is not limited to the embodiments.

First Embodiment

Figure 1:
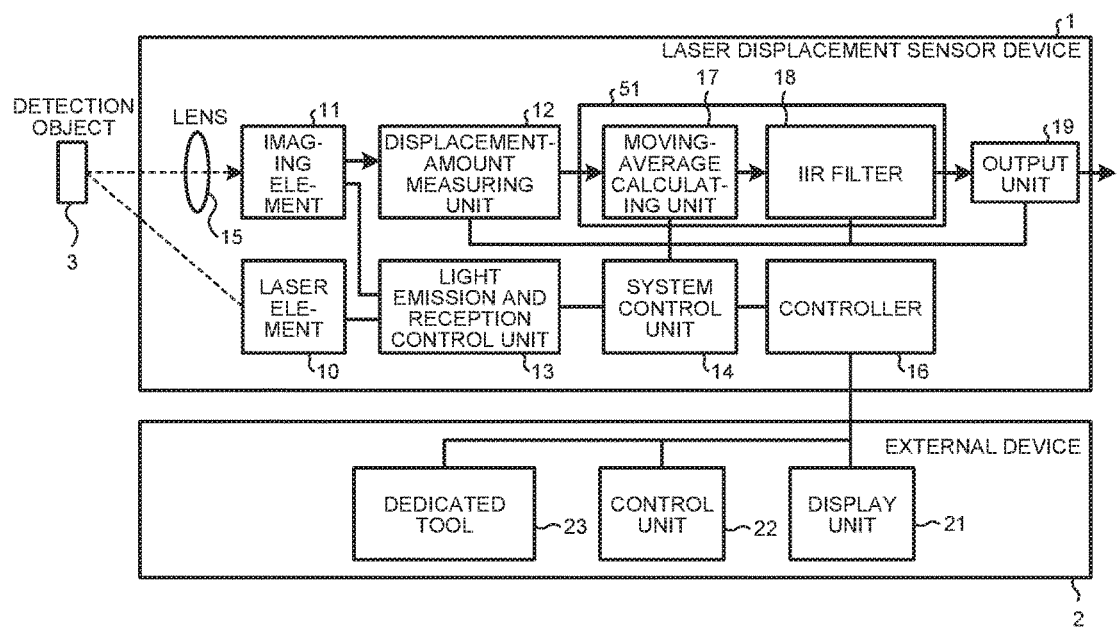
FIG. 1 is a diagram illustrating a configuration example of a laser displacement sensor device according to a first embodiment.

FIG. 1 is a diagram illustrating a configuration example of a laser displacement sensor device that is a sensor device including a signal processing device according to a first embodiment of the present invention. FIG. 1 illustrates a laser displacement sensor device 1 and also illustrates an external device 2 used in connection to the laser displacement sensor device 1.

The laser displacement sensor device 1 includes a laser element 10, an imaging element 11, a displacement-amount measuring unit 12, a light emission and reception control unit 13, a system control unit 14, a lens 15, a controller 16, a moving-average calculating unit 17, an IIR (Infinite Impulse Response) filter 18, and an output unit 19. The moving-average calculating unit 17 and the IIR filter 18 define a signal processing unit 51 serving as a signal processing device.

The laser element 10 emits laser light to be projected onto a detection object 3 that is an object whose displacement amount is to be detected. The imaging element 11 receives light reflected from the detection object 3. The displacement-amount measuring unit 12 obtains a measurement value of the displacement amount of the detection object 3 on the basis of the intensity of the light received by the imaging element 11. The light emission and reception control unit 13 controls the laser element 10 and the imaging element 11. The system control unit 14 controls the displacement-amount measuring unit 12, the light emission and reception control unit 13, the moving-average calculating unit 17, and the IIR filter 18. The lens 15 collects light reflected from the detection object 3 and makes the collected light incident on the imaging element 11. The controller 16 is a communication controller for transmitting and receiving various types of information to/from the external device 2 connected thereto via a communication line. Upon receiving, from the system control unit 14, output information to the external device 2, the controller 16 transmits the received information to the external device 2. Upon receiving information from the external device 2, the controller 16 transfers the received information to the system control unit 14. The moving-average calculating unit 17 performs moving average calculation for the measurement values of the displacement amount of the detection object 3. The IIR filter 18 reduces a noise component by performing filtering on an average value of the displacement amounts calculated by the moving-average calculating unit 17. The output unit 19 outputs the average value of the displacement amounts having the noise component reduced by the IIR filter 18.

The external device 2 includes a display unit 21, a control unit 22, and a dedicated tool 23, and is used when a user sets and check an operation parameter of the laser displacement sensor device 1 and checks a result of measurement made by the laser displacement sensor device 1, for example. The operation parameter of the laser displacement sensor device 1 is, for example, the number of data for which the moving-average calculating unit 17 performs moving average calculation, and a filter coefficient of the IIR filter 18. The external device 2 can be implemented by a personal computer or the like.

The display unit 21 displays an operation parameter of the laser displacement sensor device 1, the result of measurement made by the laser displacement sensor device 1, and the like. The control unit 22 controls each element of the external device 2. The dedicated tool 23 has a function of communicating with the laser displacement sensor device 1, and is used when a user sets an operation parameter of the laser displacement sensor device 1 and checks the set operation parameter, for example.

Next, an overall operation of the laser displacement sensor device 1 according to the present embodiment is described. In the laser displacement sensor device 1, the laser element 10 irradiates the detection object 3 with laser light, and the imaging element 11 receives reflected light from the detection object 3 through the lens 15. The imaging element 11 has an array with a plurality of photoelectric conversion elements. Each photoelectric conversion element converts received light to a voltage value corresponding to the intensity of the received light and outputs the voltage value. This provides information on an intensity distribution of the received light and the light-received position. The displacement-amount measuring unit 12 calculates the position of a peak of the intensity of the received light by using the information on the intensity distribution of the received light and the light-received position, and further obtains a displacement amount of the detection object 3 by performing triangulation using the calculated peak position. The displacement-amount measuring unit 12 outputs the obtained displacement amount to the moving-average calculating unit 17.

The displacement amount output from the displacement-amount measuring unit 12 contains noise. The moving-average calculating unit 17 performs moving average calculation for reducing this noise. Specifically, the moving-average calculating unit 17 calculates arithmetic average for displacement amounts provided by time-series input digital signals that are the last plural signals before a signal value at a specific point of time. This calculation of the average reduces a noise component contained in the displacement amount that is provided by an input signal from the displacement-amount measuring unit 12. For example, the moving-average calculating unit 17 adds up 32 values of displacement amounts and divides the resultant total values of the displacement amounts by 32 to thereby obtain an average value. After calculating the average value of the displacement amounts, the moving-average calculating unit 17 outputs the calculated average value to the IIR filter 18.

The IIR filter 18 performs digital signal processing on the average value of the displacement amounts input from the moving-average calculating unit 17 to thereby reduce a noise component remaining in the input signal.

As already described, increasing the number of points for which the moving-average calculating unit 17 calculates the moving average, that is, the number of the displacement amounts that the moving-average calculating unit 17 adds up would produce a higher noise-reduction effect due to the averaging. Unfortunately, increase in the number of points for which the moving average is calculated increases a calculation time and thus a time required for obtaining the result of calculation.

Figure 2:
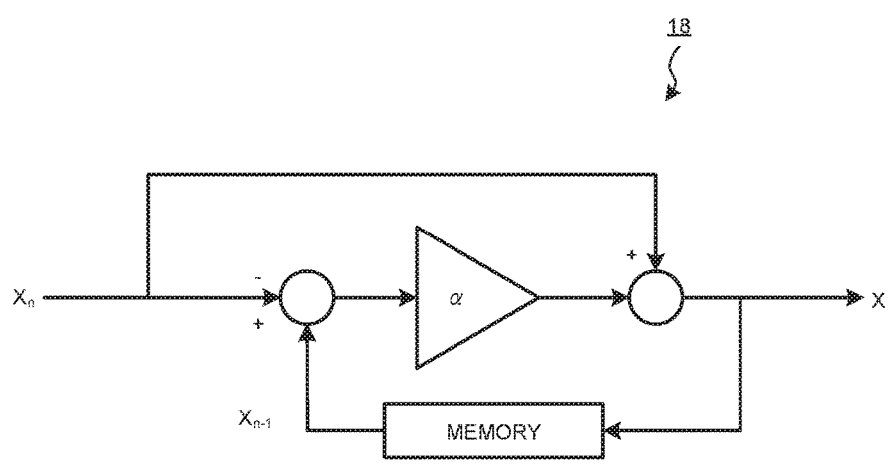
FIG. 2 is a configuration diagram of an IIR (Infinite Impulse Response) filter included in the laser displacement sensor device according to the first embodiment.

To address that problem, in the laser displacement sensor device 1 according to the present embodiment, the number of points for which the moving-average calculating unit 17 calculates the moving average is limited to an appropriate number, and the IIR filter 18 following the moving-average calculating unit 17 performs filtering processing that effectively reduces noise by performing calculation once. The IIR filter 18 is configured, as illustrated in FIG. 2. The IIR filter 18 outputs a value obtained by adding a current input signal $X_n$ to a product obtained by multiplying a difference between a last output signal $X_{n-1}$ and the current input signal by a coefficient α. The coefficient α is a filter parameter for reducing noise. A relation between the signal input to the IIR filter 18 and the signal output therefrom is represented by the following expression (1).

$$X = X_n + \alpha(X_{n-1} - X_n) \qquad (1)$$

That is, the IIR filter 18 subtracts, from the current input signal $X_n$ input as a series digital signal, noise contained in the difference that is a change between the current signal and the last output signal $X_{n-1}$ stored in a memory. The difference, which is the change, contains an actual change in the input signal, and a noise component. To address this noise component, the IIR filter 18 sets the coefficient α ($0 \leq \alpha \leq 1$). Assuming that the difference that is the change contains noise that is a times the difference, the IIR filter 18 subtracts, from the current input signal, the noise component, i.e., the value that is a times the difference between the current input signal and the last output signal, thereby reducing the noise component. The set value of the coefficient α can be obtained by measuring signal intensities and noise-component intensities to obtain a model and then performing simulation, for example. In the present embodiment, the coefficient α is set to 0.98, for example. Here, α is set on the basis of the following concept.

Where a current corrected displacement amount, that is, a value output from the IIR filter 18 is expressed by "X", a current displacement amount, that is, a value input to the IIR filter 18 is expressed by "$X_n$", the last corrected displacement amount is expressed by "$X_{n-1}$", a second corrected displacement amount that is the second to the last corrected displacement amount is expressed "$X_{n-2}$", . . . , and an n-th corrected displacement amount is expressed by "$X_1$", the following expression (2) holds true:

$$X = (1-\alpha)X_n + (1-\alpha)\alpha X_{n-1} + (1-\alpha)\alpha^2 X_{n-2} + \ldots + (1-\alpha)\alpha^{n}X_2 + \alpha^{n}X_1 \qquad (2)$$

Meanwhile, simple arithmetic average calculation that is calculation of moving average for n pieces of data is represented by the following expression (3).

$$X_{mn} = (1/n)(X_n + X_{n-1} + X_{n-2} + \ldots + X_2 + X_1) \qquad (3)$$

A difference between $X_{mn}$ and X described above is represented by the following expression (4).

$$X_{mn} - X = (1/n)(X_n + X_{n-1} + X_{n-2} + \ldots + X_2 + X_1) - (1-\alpha)X_n + (1-\alpha)\alpha X_{n-1} + \ldots + (1-\alpha)\alpha nX_2 + \alpha^{n}X_1 = [(1/n - (1-\alpha))]X_n + [(1/n - (1-\alpha)\alpha)]X_{n-1} + \ldots + [(1/n - (1-\alpha)\alpha n)]X_2 + [(1/n - \alpha^{n})]X_1 \qquad (4)$$

Figure 3:
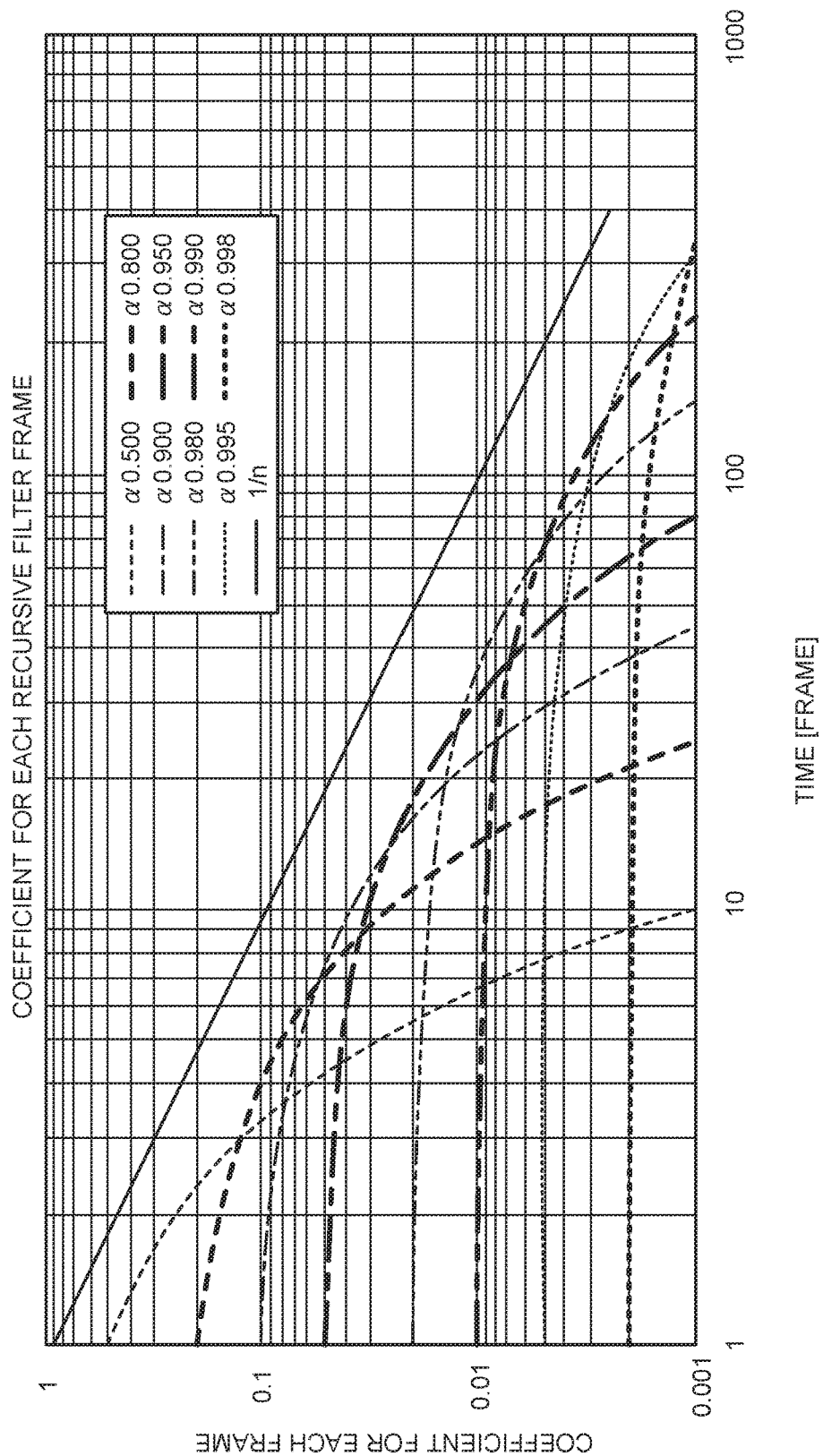
FIG. 3 is a graph illustrating an example of coefficients of the IIR filter included in the laser displacement sensor device according to the first embodiment.

A graph representing the expression (4) is illustrated in FIG. 3, and a coefficient providing an approximately straight line is the optimum coefficient.

The coefficient α is set to minimize the difference between $X_{mn}$ and X represented by the expression (4). As a result, the IIR filter 18 configured as illustrated in FIG. 2 can obtain a value corresponding to arithmetic average calculation for n times, by only using a current output value. That is, the coefficient α is set to minimize the difference between an output signal from the moving-average calculating unit 17 and an output signal from the IIR filter 18 when the same signal is input to the moving-average calculating unit 17 and the IIR filter 18. Although a is a function of an input X, where a is simplified such that a is regarded as a constant that does not depend on the input, when a that minimizes a mean square of differences of coefficients of X ($=X_1, X_2, \ldots, X_n$) is calculated for up to the n-th data, an optimum a is 0.77 for n=5, an optimum a is 0.98 for n=30, and an optimum a is 0.99 for n=100, for example. For example, when the moving-average calculating unit 17 preceding the IIR filter 18 obtains a moving average of 30 pieces of data, n is 30 and a set value of the filter coefficient of the IIR filter 18 is α=0.98. In practice, a is designed in form of a product of a constant term and a function part of an input.

Since a filter coefficient of the IIR filter 18 is appropriately set in the manner stated above, displacement amount data with noise reduced, which is output from the moving-average calculating unit 17, can be further reduced in noise by the IIR filter 18. Selecting a filter coefficient of the IIR filter 18 appropriately without providing the excess number of points for the moving-average calculating unit 17 to calculate the moving average calculation for increasing the past contribution, enables the signal processing unit 51 to optimize a relation between a noise-reduction effect produced by the moving-average calculating unit 17 and a noise-reduction effect produced by the IIR filter 18, thereby achieving desired noise-reduction performance. The signal processing unit 51 requires the smaller calculation time than that required when only the processing in the moving-average calculating unit 17 is used, but can provide the equivalent noise-reduction performance.

The value of a may be set as a unique value, or may be set to an appropriate value by the controller 16 of the laser displacement sensor device 1 as a variable parameter. In addition, the value of a may be set by using the dedicated tool 23 of the external device 2 connected to the laser displacement sensor device 1, in place of the controller 16. Furthermore, a may be updated as appropriate by a function that uses $X_n - X_{n-1}'$ as its input, instead of being set to a constant. In this case, it is possible to more effectively reduce noise and is also possible to follow an actual change in displacement amount without a time delay. Note that $X_{n-1}'$ is a value obtained by correcting $X_{n-1}$ by the IIR filter 18.

The output unit 19 of the laser displacement sensor device 1 outputs, as a measurement result of a displacement amount, a value having noise reduced by the IIR filter 18 as well as by the calculation of the moving average performed by the moving-average calculating unit 17.

Figure 4:
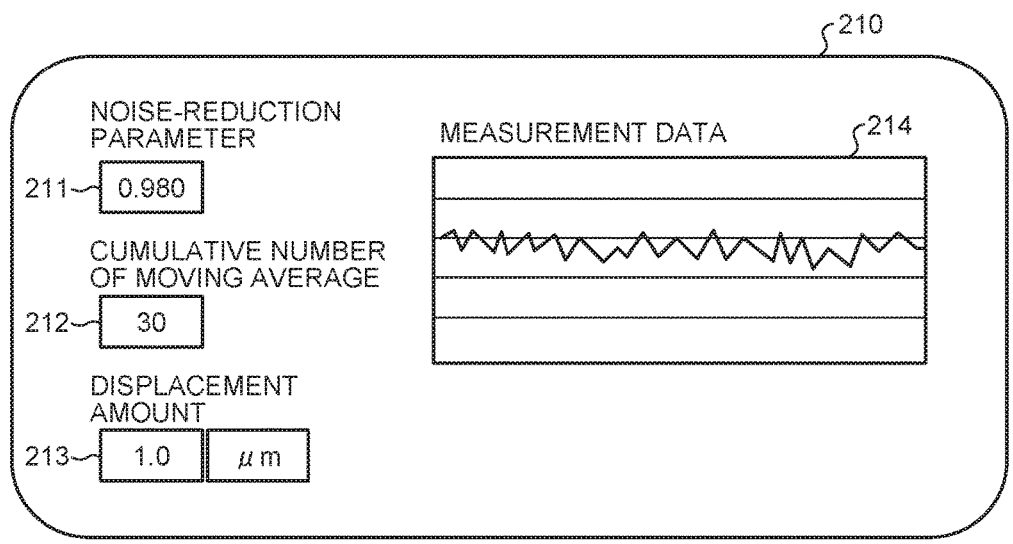
FIG. 4 is diagram illustrating an example of a screen displayed by a display unit of an external device according to the first embodiment.

In addition to the coefficient α of the IIR filter 18, setting of the number of points for which the moving-average calculating unit 17 performs the calculation, that is, setting of the number of data used when the moving-average calculating unit 17 obtains an average value may be changeable. In this case, using the dedicated tool 23 of the external device 2, a user changes the coefficient α and the setting of the number of points for which calculation is performed. FIG. 4 is a diagram illustrating an example of a screen displayed by the display unit 21 when the coefficient α and the setting of the number of points for which the calculation is performed are changed using the dedicated tool 23 of the external device 2. A user inputs a set value of the coefficient α into an item 211 showing a noise-reduction parameter on a screen 210 illustrated in FIG. 4. The user also inputs the number of points for which the calculation is performed, into an item 212 showing the cumulative number of moving average. FIG. 4 illustrates an example in which 0.980 is set as the coefficient α and 30 is set as the number of points for which the calculation is performed. The screen 210 also includes an item 213 showing a latest displacement amount measured by the laser displacement sensor device 1 and an item 214 showing displacement amounts in a certain period of time in the past from the present moment. In FIG. 4, the latest displacement amount is displayed in terms of μm. Viewing measured values of the displacement amounts shown in the items 213 and 214, a user can change the coefficient α and the setting of the number of points for which the calculation is performed. Therefore, the user can efficiently change the setting value because, when the changed setting value is used, he can immediately know whether a desired noise-reduction effect can be obtained.

As described above, in the laser displacement sensor device 1 according to the present embodiment, noise contained in a displacement amount measured by the displacement-amount measuring unit 12 is reduced by using two-step processing: moving average processing by the moving-average calculating unit 17; and filtering processing by the IIR filter 18.

The greater, the sampling number used when a moving average value is obtained is, the more effective, noise reduction by moving average is. Assuming that noise has a Gaussian distribution, the number of samples for calculation is increased N times to thereby reduce an error component (a standard deviation) by a factor of approximately $\sqrt{N}$. On the other hand, the number of the samples for calculation must not be increased meaninglessly because increasing the calculation sampling number increases a calculation time. For this reason, the number of the samples for calculation should be limited to an appropriate number, which would result in sacrifice of the effect of reducing the error component. In contrast, the laser displacement sensor device according to the present embodiment performs noise reduction by performing IIR filtering on a result of calculation of moving average. It is therefore possible to improve a noise-reduction effect without increasing a calculation amount of moving average. When the laser displacement sensor device according to the present embodiment obtains the noise-reduction performance equivalent to that obtained by only the calculation of moving average, the number of times the calculation of moving average is performed can be reduced to two-thirds to one-half thereof or less.

Next, hardware that implements the displacement-amount measuring unit 12 and the moving-average calculating unit 17 of the laser displacement sensor device 1 is described. The displacement-amount measuring unit 12 and the moving-average calculating unit 17 of the laser displacement sensor device 1 can be implemented by a processor 101 and a memory 102 illustrated in FIG. 5. The processor 101 is, for example, a CPU (Central Processing Unit, also referred to as "central processing device", "processing device", "arithmetic unit", "microprocessor", "microcomputer", "processor", and "DSP (Digital Signal Processor)"), system LSI (Large Scale Integration), and the like. The memory 102 is, for example, a nonvolatile or volatile semiconductor memory such as a RAM (Random Access Memory), a ROM (Read Only Memory), a flash memory, an EPROM (Erasable Programmable Read Only Memory), or an EEPROM® (Electrically Erasable Programmable Read-Only Memory), a magnetic disk, a flexible disk, an optical disk, a compact disk, a mini disk, or a DVD (Digital Versatile Disk).

The displacement-amount measuring unit 12 and the moving-average calculating unit 17 can be implemented by reading the corresponding programs from the memory 102 and executing those programs by the processor 101. The memory 102 is also used as a temporarily memory in each process performed by the processor 101.

Each of the displacement-amount measuring unit 12 and the moving-average calculating unit 17 can be also implemented by a processing circuit as dedicated hardware. In this case, the processing circuit is a single circuit, a composite circuit, a programmed processor, a parallel programmed processor, an ASIC (Application Specific Integrated Circuit), an FPGA (Field Programmable Gate Array), or a circuit that combines these circuits. One of the displacement-amount measuring unit 12 and the moving-average calculating unit 17 may be implemented by dedicated hardware, and the other may be implemented by the processor 101 and the memory 102.

Figure 5:
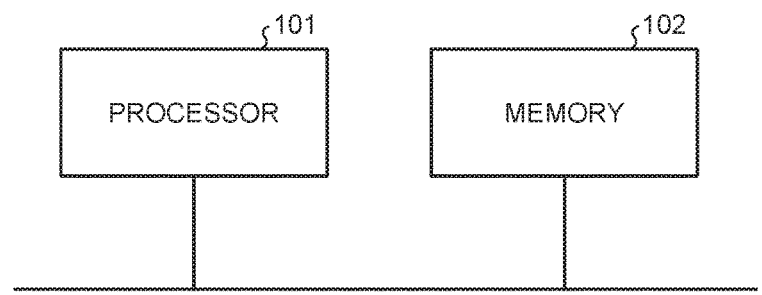
FIG. 5 is a diagram illustrating hardware that implements a displacement-amount measuring unit and a moving-average calculating unit of the laser displacement sensor device according to the first embodiment.

Also, the light emission and reception control unit 13, the system control unit 14, and the controller 16 of the laser displacement sensor device 1 can be implemented by the processor 101 and the memory 102 illustrated in FIG. 5.

Second Embodiment

Figure 6:
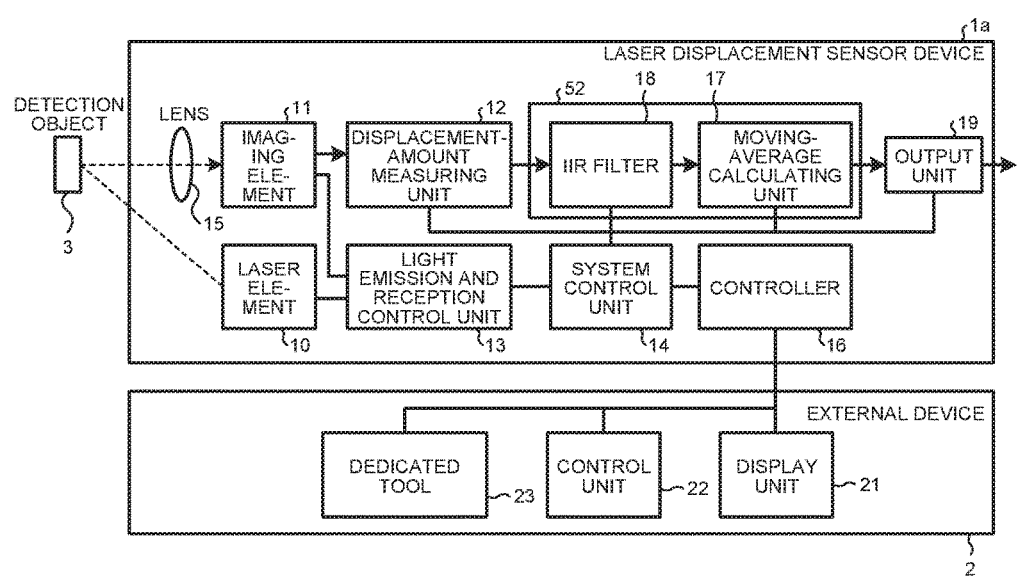
FIG. 6 is a diagram illustrating a configuration example of a laser displacement sensor device according to a second embodiment.

FIG. 6 is a diagram illustrating a configuration example of a laser displacement sensor device according to a second embodiment. A laser displacement sensor device 1a according to the second embodiment corresponds to the laser displacement sensor device 1 according to the first embodiment illustrated in FIG. 1 with the signal processing unit 51 replaced with a signal processing unit 52. Elements other than the signal processing unit 52 of the laser displacement sensor device 1a are identical to those of the laser displacement sensor device 1 according to the first embodiment, and therefore explanations thereof are omitted.

The signal processing unit 52 includes the IIR filter 18 and the moving-average calculating unit 17. The IIR filter 18 performs filtering processing for reducing noise in a displacement amount output from the displacement-amount measuring unit 12. The moving-average calculating unit 17 performs moving average calculation for a displacement amount output from the IIR filter 18. The signal processing unit 52 according to the second embodiment differs from the signal processing unit 51 described in the first embodiment in the order of performance of the filtering processing and the moving average calculation, that is, in the order of arrangement of the moving-average calculating unit 17 and the IIR filter 18. Each processing performed by the moving-average calculating unit 17 and the IIR filter 18 of the signal processing unit 51 is identical to each processing performed by the moving-average calculating unit 17 and the IIR filter 18 of the signal processing unit 52.

As described above, in the laser displacement sensor device 1a according to the present embodiment, noise contained in a displacement amount measured by the displacement-amount measuring unit 12 is reduced by using two-step processing: filtering processing by the IIR filter 18; and moving average processing by the moving-average calculating unit 17. Because the IIR filter 18 precedes the moving-average calculating unit 17 in the laser displacement sensor device 1a according to the second embodiment, the laser displacement sensor device 1a has a feature that, as compared with the laser displacement sensor device 1 according to the first embodiment, the noise-reduction effect is less but responsiveness to change in an input signal is improved. Also in the laser displacement sensor device 1a according to the second embodiment, it is possible to improve a noise-reduction effect without increasing a calculation amount of moving average, similarly to the laser displacement sensor device 1 according to the first embodiment.

Third Embodiment

Figure 7:
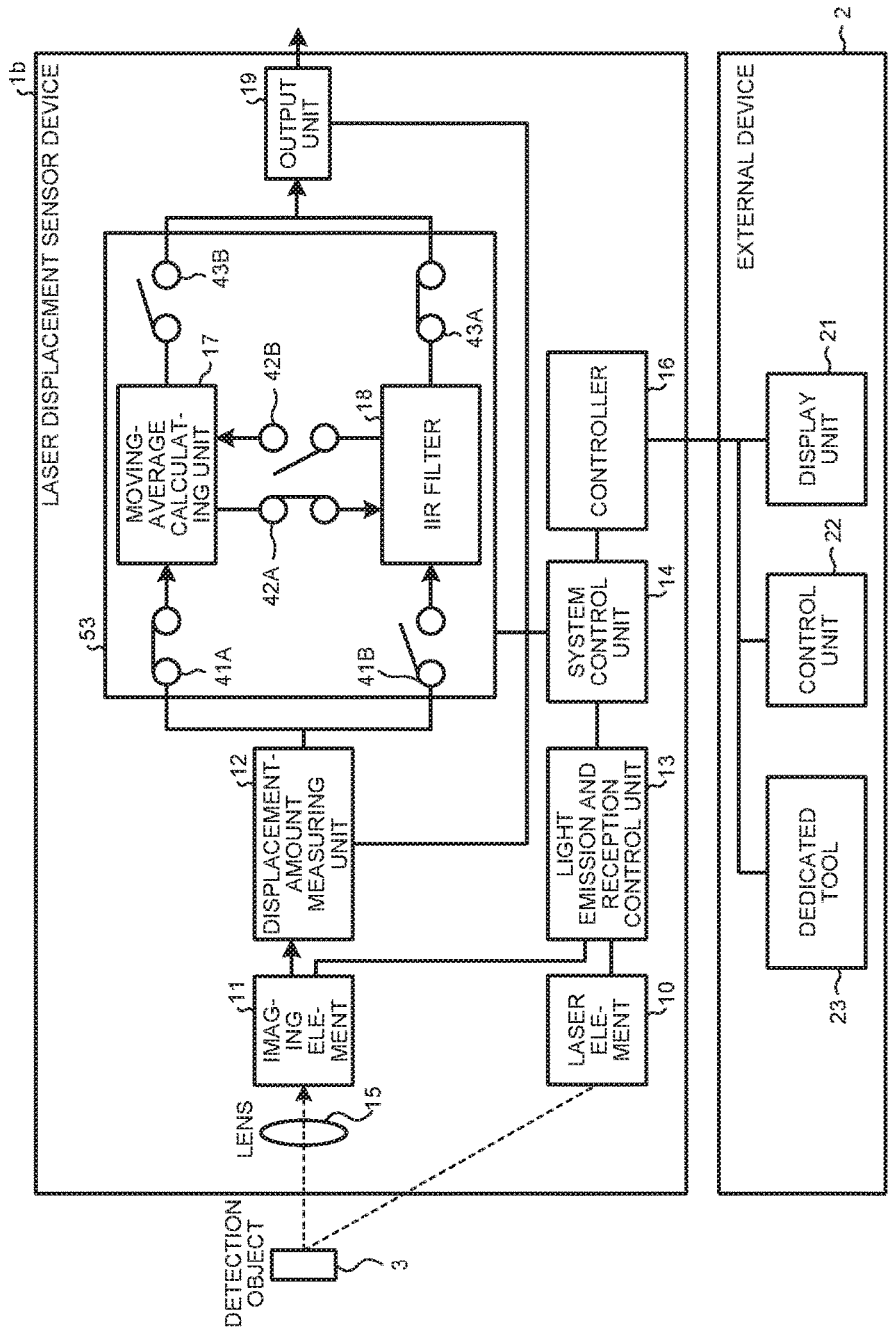
FIG. 7 is a diagram illustrating a configuration example of a laser displacement sensor device according to a third embodiment.

FIG. 7 is a diagram illustrating a configuration example of a laser displacement sensor device according to a third embodiment. A laser displacement sensor device 1b according to the third embodiment corresponds to the laser displacement sensor device 1 according to the first embodiment illustrated in FIG. 1 with the signal processing unit 51 replaced with a signal processing unit 53. Elements other than the signal processing unit 53 of the laser displacement sensor device 1b are identical to those of the laser displacement sensor device 1 according to the first embodiment, and therefore explanations thereof are omitted.

The signal processing unit 53 includes the moving-average calculating unit 17 and the IIR filter 18 described in the first embodiment and switches 41A, 41B, 42A, 42B, 43A, and 43B. This signal processing unit 53 can change a connection relation between the moving-average calculating unit 17 and the IIR filter 18 by changing positions of the switches 41A, 41B, 42A, 42B, 43A, and 43B. Further, the signal processing unit 53 can also change a connection relation between each of the moving-average calculating unit 17 and the IIR filter 18 and each of the displacement-amount measuring unit 12 and the output unit 19 that are provided outside the unit 17 and the filter 19. The switches 41A and 41B are simultaneously controlled such that one of the switches 41A and 41B is set to a closed position (an ON position) and the other switch is set to an opened position (an OFF position). Similarly, the switches 42A and 42B are simultaneously controlled such that one of the switches 42A and 42B is set to a closed position and the other switch is set to an opened position. The switches 43A and 43B are simultaneously controlled such that one of the switches 43A and 43B is set to a closed position and the other switch is set to an opened position. That is, both of the two switches simultaneously controlled cannot be in the closed position or the opened position at the same time. The switches 41A, 41B, 42A, 42B, 43A, and 43B are switching units that change the connection relation between the moving-average calculating unit 17 and the IIR filter 18.

FIG. 8 is a diagram illustrating setting patterns of the respective switches included in the signal processing unit 53. In the present embodiment, the switches are set in accordance with any of patterns #1 to #4 illustrated in FIG. 8. It is noted that a user can change the setting of the switches by using the dedicated tool 23 of the external device 2.

In the pattern #1 illustrated in FIG. 8, the switches 41A, 42A, and 43A are set to be in the ON positions and the remaining switches are set to be in the OFF positions. In this case, when a signal is input from the displacement-amount measuring unit 12 to the signal processing unit 53, the input signal is first processed by the moving-average calculating unit 17, then processed by the IIR filter 18, and finally output from the signal processing unit 53. For the setting in accordance with the pattern #1, processing performed by the signal processing unit 53 is identical to the processing performed by the signal processing unit 51 of the laser displacement sensor device 1 according to the first embodiment.

In the pattern #2 illustrated in FIG. 8, the switches 41B, 42B, and 43B are set to be in the ON positions and the remaining switches are set to be in the OFF positions. In this case, when a signal is input from the displacement-amount measuring unit 12 to the signal processing unit 53, the input signal is first processed by the IIR filter 18, then processed by the moving-average calculating unit 17, and finally output from the signal processing unit 53. For the setting in accordance with the pattern #2, processing performed by the signal processing unit 53 is identical to the processing performed by the signal processing unit 52 of the laser displacement sensor device 1a according to the second embodiment.

In the pattern #3 illustrated in FIG. 8, the switches 41A and 43B are set to be in the ON positions and the remaining switches are set to be in the OFF positions. In this case, when a signal is input from the displacement-amount measuring unit 12 to the signal processing unit 53, the input signal is processed by the moving-average calculating unit 17, and thereafter output from the signal processing unit 53. For the setting in accordance with the pattern #3, only the moving-average calculating unit 17 of the signal processing unit 53 is used to reduce noise contained in a displacement amount that is the input signal.

In the pattern #4 illustrated in FIG. 8, the switches 41B and 43A are set to be in the ON positions and the remaining switches are set to be in the OFF positions. In this case, when a signal is input from the displacement-amount measuring unit 12 to the signal processing unit 53, the input signal is processed by the IIR filter 18, and thereafter output from the signal processing unit 53. For the setting in accordance with the pattern #4, only the IIR filter 18 of the signal processing unit 53 is used to reduce noise contained in a displacement amount that is the input signal.

As described above, the laser displacement sensor device 1b according to the present embodiment includes the moving-average calculating unit 17 and the IIR filter 18, and the switches 41A, 41B, 42A, 42B, 43A, and 43B for changing the connection relation between the moving-average calculating unit 17 and the IIR filter 18. It is therefore possible to flexibly change the format of processing that reduces noise contained in a displacement amount measured by the displacement-amount measuring unit 12.

While, in the present embodiment, the description has been made as to an example in which the signal processing unit 53 includes the IIR filter 18 in a single stage and the moving-average calculating unit 17 in a single stage for facilitating the description of the present embodiment, the signal processing unit 53 may be configured to include IIR filters in plural stages and moving-average calculating units in plural stages. In this case, the signal processing unit 53 includes a switch for changing a connection relation between the IIR filters in the plural stages and the moving-average calculating units in the plural stages, a switch for changing the number of stages for the IIR filters, and a switch for changing the number of stages for the moving-average calculating units. This enables the signal processing unit 53 to change the combination of noise-reduction processing in accordance with at least one of a condition of an object to be measured and an environment of the laser displacement sensor device 1b. Further, then, it is not necessary that the number of stages for the moving-average calculating units is the same as that for the IIR filters. Furthermore, the signal processing unit 53 may be configured such that another digital filter, such as a median filter, is inserted at any position in accordance with at least one of the type and the characteristics of noise of an object to be measured by the laser displacement sensor device 1b.

The configurations described in the above embodiments are only examples of the content of the present invention. The configurations can be combined with other well-known techniques, and a part of each configuration can be omitted or modified without departing from the scope of the present invention.

REFERENCE SIGNS LIST 1, 1a, 1b laser displacement sensor device, 2 external device, 10 laser element, 11 imaging element, 12 displacement-amount measuring unit, 13 light emission and reception control unit, 14 system control unit, 15 lens, 16 controller, 17 moving-average calculating unit, 18 IIR filter, 19 output unit, 21 display unit, 22 control unit, 23 dedicated tool, 41A, 41B, 42A, 42B, 43A, 43B switch, 51, 52, 53 signal processing unit.

The invention claimed is:

1. A signal processing device to perform processing for reducing noise in a displacement amount measured on a basis of light reflected from a detection object, the device comprising:
   moving-average calculating circuitry to perform moving average calculation for an input signal to reduce a noise component contained in the input signal; and
   infinite impulse response filter circuitry to reduce a noise component contained in an input signal by digital signal processing,
   wherein a filter coefficient of the infinite impulse response filter circuitry is determined on a basis of a difference between a first calculation result output by the moving-average calculating circuitry and a second calculation result output by the infinite impulse response filter circuitry, when a same signal is input to the moving-average calculating circuitry and the infinite impulse response filter circuitry.

2. The signal processing device according to claim 1, wherein the filter coefficient is determined such that the difference between the first calculation result and the second calculation result is close to zero.

3. The signal processing device according to claim 1, wherein the displacement amount is an input signal to the moving-average calculating circuitry, and an output signal from the moving-average calculating circuitry is an input signal to the infinite impulse response filter circuitry.

4. The signal processing device according to claim 1, wherein the displacement amount is an input signal to the infinite impulse response filter circuitry, and an output signal from the infinite impulse response filter circuitry is an input signal to the moving-average calculating circuitry.

5. The signal processing device according to claim 1, further comprising switching circuitry to change a connection relation between the moving-average calculating circuitry and the infinite impulse response filter circuitry.

6. A sensor device comprising:
   a laser to irradiate a detection object with laser light;
   displacement-amount measuring circuitry to measure a displacement amount of the detection object on a basis of a received-light intensity of light reflected from the detection object; and
   the signal processing device according to claim 1.

7. A signal processing method for reducing noise in a displacement amount measured on a basis of light reflected from a detection object, the method comprising:
   performing moving average calculation for an input signal to reduce a noise component contained in the input signal; and
   reducing a noise component contained in an input signal, by digital signal processing, wherein
   a filter coefficient of infinite impulse response filter circutry is determined on a basis of a difference between a first calculation result output by a moving-average calculating circuitry and a second calculation result output by the infinite impulse response filter circuitry, when a same signal is input to the moving-average calculating circuitry and the infinite impulse response filter circuitry.

8. The signal processing device according to claim 2, wherein:
   the displacement amount is an input signal to the moving-average calculation circuitry, and an output signal from the moving-average calculation circuitry is an input signal to the infinite impulse response filter circuitry.

9. The signal processing device according to claim 2, wherein:
   the displacement amount is an input signal to the infinite impulse response filter circuitry, and an output signal from the infinite impulse response filter circuitry is an input signal to the moving-average calculation circuitry.

10. The signal processing device according to claim 2, further comprising:
    switching circuitry to change a connection relation between the moving-average calculation circuitry and the infinite impulse response filter circuitry.

11. A sensor device comprising:
    a laser to irradiate a detection object with laser light;
    displacement-amount measuring circuitry to measure a displacement amount of the detection object on a basis of a received-light intensity of light reflected from the detection object; and
    the signal processing device according to claim 2.

12. A sensor device comprising:
    a laser to irradiate a detection object with laser light;
    displacement-amount measuring circuitry to measure a displacement amount of the detection object on a basis of a received-light intensity of light reflected from the detection object; and
    the signal processing device according to claim 3.

13. A sensor device comprising:
    a laser to irradiate a detection object with laser light;
    displacement-amount measuring circuitry to measure a displacement amount of the detection object on a basis of a received-light intensity of light reflected from the detection object; and
    the signal processing device according to claim 8.

14. A sensor device comprising:
    a laser to irradiate a detection object with laser light;
    displacement-amount measuring circuitry to measure a displacement amount of the detection object on a basis of a received-light intensity of light reflected from the detection object; and
    the signal processing device according to claim 4.

15. A sensor device comprising:
    a laser to irradiate a detection object with laser light;
    displacement-amount measuring circuitry to measure a displacement amount of the detection object on a basis of a received-light intensity of light reflected from the detection object; and
    the signal processing device according to claim 9.

16. A sensor device comprising:
    a laser to irradiate a detection object with laser light;
    displacement-amount measuring circuitry to measure a displacement amount of the detection object on a basis of a received-light intensity of light reflected from the detection object; and
    the signal processing device according to claim 5.

17. A sensor device comprising:
    a laser to irradiate a detection object with laser light;
    displacement-amount measuring circuitry to measure a displacement amount of the detection object on a basis of a received-light intensity of light reflected from the detection object; and
    the signal processing device according to claim 10.

* * * * *